(12) United States Patent
Lang et al.

(10) Patent No.: US 9,334,378 B2
(45) Date of Patent: May 10, 2016

(54) DISTORTION RESISTANT TRANSPARENT REINFORCING FIBERS FOR USE IN TRANSPARENT REINFORCED COMPOSITES

(75) Inventors: Adam J. Lang, Huntington Beach, CA (US); Mark S. Wilenski, Seattle, WA (US); Alan M. Markus, Lake Forest, CA (US); Larry A. Godby, North Hills, CA (US)

(73) Assignee: The Boeing Company, Chicago, IL (US)

( * ) Notice: Subject to any disclaimer, the term of this patent is extended or adjusted under 35 U.S.C. 154(b) by 546 days.

(21) Appl. No.: 12/015,221

(22) Filed: Jan. 16, 2008

(65) Prior Publication Data

US 2009/0181211 A1   Jul. 16, 2009

(51) Int. Cl.

| | |
|---|---|
| *G08B 19/02* | (2006.01) |
| *C08J 5/04* | (2006.01) |
| *B64C 1/14* | (2006.01) |
| *D06M 23/16* | (2006.01) |
| *F41H 5/04* | (2006.01) |
| *G02B 6/44* | (2006.01) |

(52) U.S. Cl.
CPC ............... *C08J 5/043* (2013.01); *B64C 1/1492* (2013.01); *D06M 23/16* (2013.01); *F41H 5/0407* (2013.01); *G02B 6/4403* (2013.01); *Y10T 428/24058* (2015.01); *Y10T 428/24124* (2015.01)

(58) Field of Classification Search
CPC .... G02B 6/241; G02B 6/3807; G02B 6/4203; G02B 6/3861; G02B 6/3863; G02B 6/3847; G02B 6/24; G02B 6/238; G02B 6/42; G02B 6/4403; Y10T 428/24058; Y10T 428/24124; Y10T 442/67; Y10T 442/2992; Y10T 428/252; Y10T 428/24132; Y10T 428/249946; Y10T 428/31612; Y10T 428/2962; Y10T 428/31511; Y10T 428/31507; Y10T 428/31525; B29L 2009/00; B32B 5/28; B32B 5/08; B32B 17/10018; B32B 17/10302; B32B 17/10366; C08J 5/043; C08J 5/24; C08J 5/08; D06M 23/16; B64C 1/1492; B64C 1/1484; F41H 5/0407; G08B 19/02; G08B 19/00; C08K 3/40; B29C 47/00; B29C 45/00; B29C 49/00; B29C 70/086; B29C 70/20; B29D 11/00; B29K 2309/08; B29K 2033/12; B29K 2995/0026; C08L 77/00; Y02T 50/433; Y10S 428/902
USPC ........... 428/193, 297.4, 114, 298.7, 113, 105, 428/138, 139, 34, 140, 412, 413, 417, 426, 428/299.4, 391, 429, 902, 325; 442/185, 442/186, 391, 180; 2/427; 156/201, 88, 156/178, 242, 102, 104, 106, 107, 108, 330, 156/179; 340/583, 962, 580; 385/31, 141, 385/143, 145, 123, 902; 356/381, 382; 350/96.2, 96.3, 96.29, 96.31, 96.32, 350/96.33, 96.34; 427/192, 430.1; 296/84.1; 52/204.591, 204.593
See application file for complete search history.

(56) References Cited

U.S. PATENT DOCUMENTS

| | | | | |
|---|---|---|---|---|
| 3,516,001 | A | * | 6/1970 | Ask et al. ........................ 372/6 |
| 4,185,274 | A | * | 1/1980 | Giallorenzi .................... 341/13 |

(Continued)

FOREIGN PATENT DOCUMENTS

WO          9630203 A1     10/1996

OTHER PUBLICATIONS www.gcsescience.com. Refraction of Light through a Glass block. copyright 2012.*

*Primary Examiner* — Jacob T Minskey
*Assistant Examiner* — Altrev Sykes
(74) *Attorney, Agent, or Firm* — Smith Moore Leatherwood LLP (57) ABSTRACT

A reinforcing fiber for reinforcing a transparent matrix composite. The fiber includes a substantially transparent fiber ribbon having an elongated cross-sectional geometry. The fiber ribbon includes edges that are substantially opaque. Light is substantially prevented from passing through the opaque edges to reduce or eliminate light distortion through the fiber. A composite utilizing the reinforcing fibers and a method for making a window assembly and a method for manufacturing a vehicle are also disclosed.

27 Claims, 7 Drawing Sheets

(56) References Cited

U.S. PATENT DOCUMENTS

| | | | |
|---|---|---|---|
| 4,436,366 A * | 3/1984 | Abramson | 385/31 |
| 5,566,267 A * | 10/1996 | Neuberger | 385/123 |
| 5,665,450 A * | 9/1997 | Day et al. | 428/114 |
| 5,748,091 A * | 5/1998 | Kim | 340/583 |
| 6,630,231 B2 * | 10/2003 | Perez et al. | 428/297.4 |
| 2004/0062934 A1 | 4/2004 | Miller et al. | |
| 2005/0079326 A1 * | 4/2005 | Varaprasad et al. | 428/193 |

* cited by examiner

DISTORTION RESISTANT TRANSPARENT REINFORCING FIBERS FOR USE IN TRANSPARENT REINFORCED COMPOSITES

FIELD OF THE INVENTION

The present invention is directed to transparent reinforcing materials and reinforced composite materials.

BACKGROUND OF THE INVENTION

Transparent composite materials are known for use in vehicle and other applications requiring light transmission or visual transparency. Such transparent composite materials include windows or other transparent materials useful for light transmission therethrough, particularly in hostile environment and in locations requiring ballistic resistance. Such reinforcement further provides the window or transparent device resistance to cracking or breakage and/or reduced system weight.

Transparent composite materials typically include a reinforcing fiber. In order to render the composite material transparent, both the matrix material and the reinforcing fiber are fabricated from a transparent material. The materials typically do not have the same optical properties over the entire operational envelope, thus resulting in distortion. For example, the refractive index of the matrix material and the reinforcing fiber may not be the same, resulting in a bending or refracting of the light passing through the composite.

Geometry of reinforcing fibers also affects the distortion of light passing through the transparent device. For example, round fibers (i.e., fibers having circular cross-sections) provide prismatic or other optical light refractive effects that provide overall distortion of the light passing through the transparent device.

In addition, the optical properties of the matrix material and reinforcing fiber may be dependent upon temperature, wherein the materials in the matrix and the materials in the reinforcing material have optical properties that are independently dependent upon temperature. Known reinforcing systems suffer from the drawback that applications with a high temperature variation, including operation in locations having high ambient temperatures results in a large change in optical properties (e.g., change in refractive index), which provides increased distortion of light passing through the transparent device.

What is needed is a transparent reinforcing material is that is resistant to light distortion at various temperatures and does not suffer from the drawbacks of the prior art.

SUMMARY OF THE INVENTION

A first aspect of the disclosure includes a reinforcing fiber for reinforcing a transparent matrix composite. The fiber includes a substantially transparent fiber ribbon having an elongated cross-sectional geometry. The fiber ribbon includes edges that are substantially opaque. Light is substantially prevented from passing through the opaque edges to reduce or eliminate light distortion caused by the edges.

Another aspect of the disclosure includes a substantially transparent reinforced matrix composite. The composite includes a substantially transparent matrix material and a plurality of reinforcing fiber ribbons disposed in the transparent matrix material, the fiber ribbons having an elongated cross-sectional geometry, the fiber ribbons having one or more edges that are substantially opaque. Light is substantially prevented from passing through the opaque edges to reduce or eliminate light distortion through the composite.

Still another aspect of the disclosure includes a method for fabricating a window assembly. The method includes providing a plurality of reinforcing fiber ribbons. The fiber ribbons include an elongated cross-sectional geometry and have one or more edges that are substantially opaque. Light is substantially prevented from passing through the opaque edges. The plurality of reinforcing fiber ribbons are arranged and disposed into a substantially transparent matrix. The matrix is cured to form a substantially transparent reinforced matrix composite. The composite is assembled into a window assembly.

Still another aspect of the disclosure includes a method for providing a vehicle. The method further includes providing a transparent reinforced matrix composite. The composite includes a substantially transparent matrix material and a plurality of reinforcing fiber ribbons disposed in the transparent matrix material, the fiber ribbons having an elongated cross-sectional geometry, the fiber ribbons having one or more edges that are substantially opaque. Light is substantially prevented from passing through the opaque edges to reduce or eliminate light distortion through the composite. The transparent reinforced matrix composite is assembled into the vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

"Transparent", "transparency" and grammatical variations thereof include an ability of a material to permit passage of at least a portion of visible light (e.g., light having a wavelength of from about 380 nm to about 700 nm) or light having other desired wavelengths, such as night vision (e.g., about 700 nm to about 1000 nm) and/or infrared (e.g. from about 1000 nm to about 2000 nm), directed at the material. "Opaque" and grammatical variations thereof include an ability of a material to absorb substantially all light in the desired wavelengths (e.g., visible spectrum, night vision spectrum or infrared spectrum), directed at the material.

Figure 1:
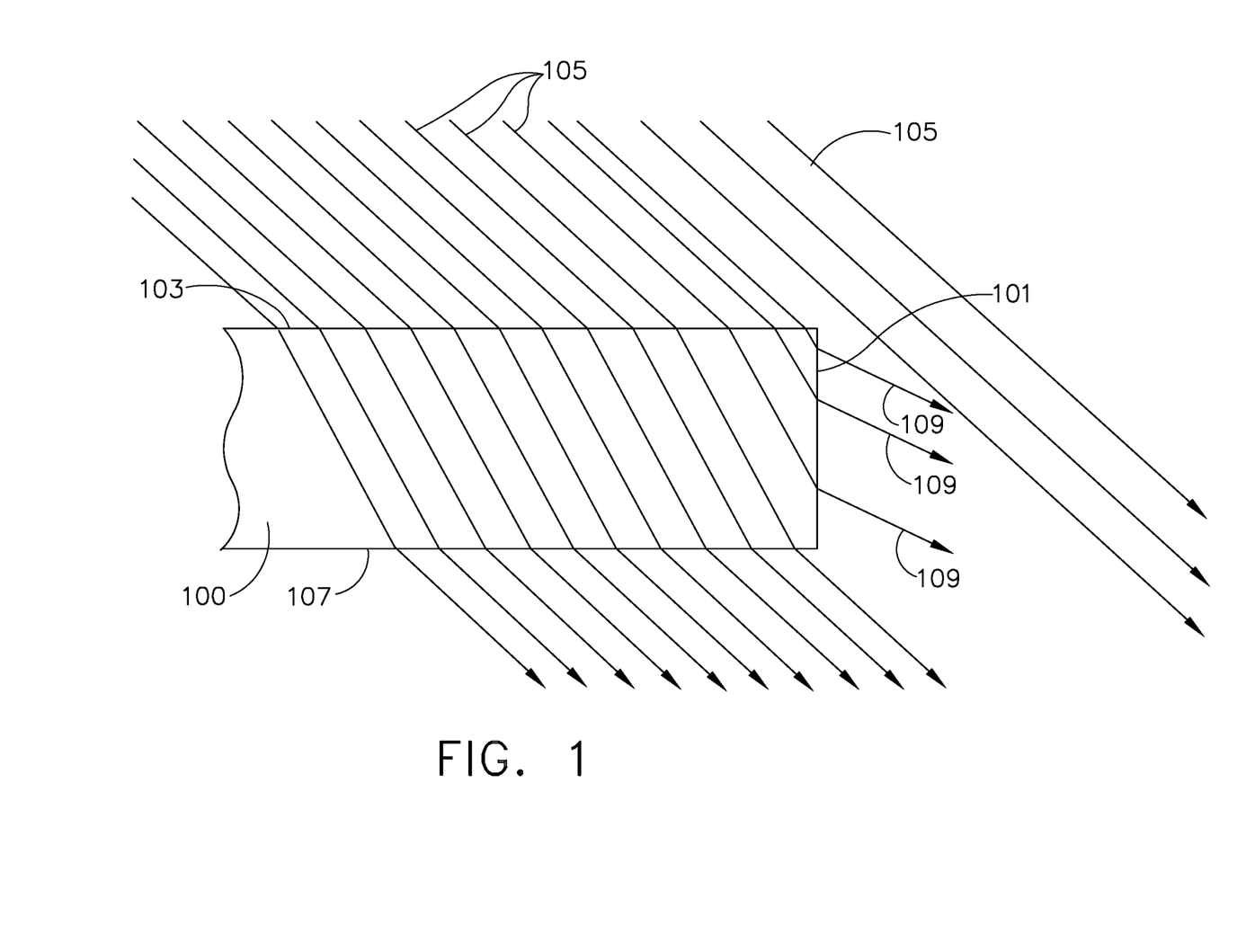
FIG. 1 shows a schematic cross-sectional view of a fiber ribbon having transparent edges.

FIG. 1 shows a cross-sectional view of a transparent fiber ribbon 100. The transparent fiber ribbon 100 is fabricated from any suitable transparent reinforcing material. Suitable materials include, but are not limited to glass, such as optical grade glass, liquid crystal display screen glass, and partially crystalline glasses. In a certain embodiment, the fiber ribbon 100 is a glass fiber that is drawn under heat and pressure to form a fiber ribbon 100 having an elongated cross-section. As shown in FIG. 1, the elongated cross-section includes an edge 101 at a substantially perpendicular angle to a flattened first surface 103. By "elongated geometry", it is meant that the geometry of the cross-section includes dimensions in a first direction and dimensions in a second direction, wherein the dimensions in the first direction are greater than the dimensions in the second direction. The geometries are not limited to linear geometries and may include curved or complex shapes. Suitable cross-sectional elongated geometries may include rectangular geometries, oval geometries, rectangular geometries having curved and linear edges or any other geometries having one dimension greater than another dimension. One preferable geometry may include a flattened first edge and a flattened second edge having the longer dimension and being aligned along substantially parallel planes.

The flattened first surface 103 is a surface through which light 105 may enter fiber ribbon 100. Light 105 is shown directionally in a schematic diagram to illustrate general refraction or bending of the light direction and is not intended to be limiting of the material or the actual refraction or direction of the light 105 as it passes through fiber ribbon 100. As the light 105 enters the fiber ribbon 100, a difference in refractive index causes the light to bend. The amount of change of direction is dependent upon the refractive index of the resin, the refractive index of the fiber, and the fiber geometry. Further, the angle at which the light contacts the material affects the amount of directional change for light 105. As the light 105 passes through the material, the direction of the light remains substantially constant. However, as the light 105 exits the fiber ribbon 100, the light 105 changes direction. Along flattened second surface 107, the light changes direction in a substantially uniform manner. That is, the light exiting the fiber ribbon 100 refracts at an angle that is substantially constant along the flattened second surface 107. Refracted light 109 exiting the fiber ribbon 100 along edge 101 refracts at an angle dissimilar to the light 105 exiting along the second flattened edge 107. As shown in FIG. 1, the light 105 exiting fiber ribbon 100 along second flattened surface 107 is directed in a direction substantially similar to the direction of light that does not enter the fiber ribbon 100, as depicted by the three lines labeled 105 to the upper right hand portion of FIG. 1. However, the refracted light 109 is directed in a direction that is different and at varying angles to light that does not enter the fiber ribbon 100, thereby distorting the light and distorting any image viewable through the fiber ribbon 100.

Figure 2:
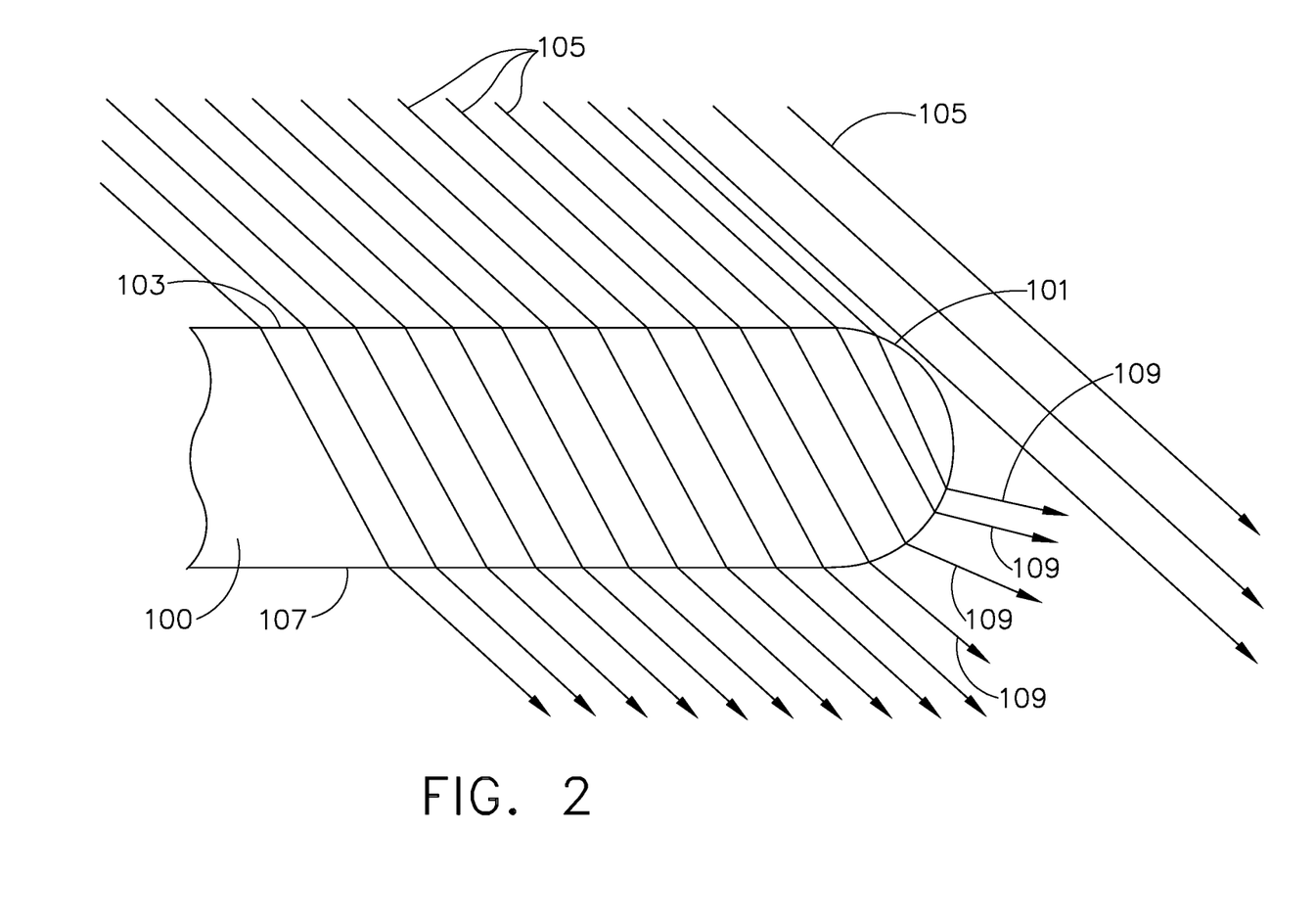
FIG. 2 shows a schematic cross-sectional view of another fiber ribbon having transparent edges.

FIG. 2 shows a cross-sectional view of a transparent fiber ribbon 100 having a construction substantially identical to the fiber ribbon shown in FIG. 1, wherein the geometry of edge 101 is curved. As in FIG. 1, the light exiting fiber ribbon 100 refracts forming refracted light 109, distorting the light and distorting any image viewable through the fiber ribbon 100.

Figure 3:
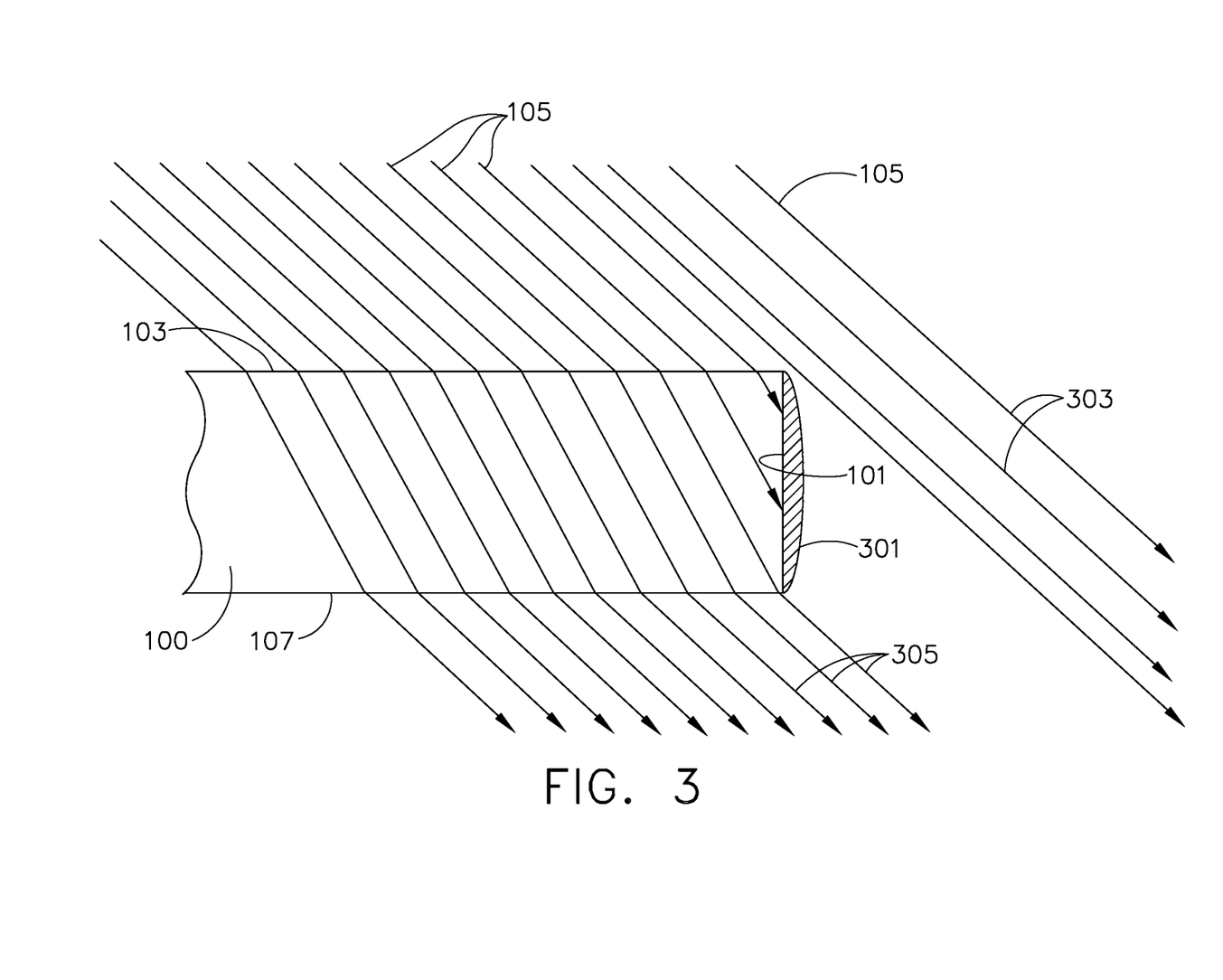
FIG. 3 shows a schematic cross-sectional view of a fiber ribbon according to an embodiment of the present disclosure.

FIG. 3 shows a cross-sectional view of a transparent fiber ribbon 100 according to an embodiment of the present disclosure having a construction substantially identical to the fiber ribbon shown in FIG. 1. In addition, to the fiber ribbon 100 structure of FIG. 1, the transparent fiber ribbon 100 includes an opaque portion 301 along edge 101. The opaque portion 301 includes an opaque material or coating that is capable of absorbing light 105. In this embodiment, the opaque portion 301 includes a curved portion of opaque material. The opaque portion 301 may be affixed to the fiber ribbon 100, may be adjacent or in close proximity to the fiber ribbon 100 or may be integrally formed with fiber ribbon 100. The opaque portion 301 may include any suitable material that is opaque and absorbs light. Suitable opaque materials include, but are not limited to, crushed optically opaque glass (e.g., black glass), optically opaque paint, optically opaque rods (e.g., black rods), metallic layers, diffused impurities other materials that absorb light. Although not shown in FIG. 3, the opaque portion 301 may be applied to both distal edges and portions of the flattened first surface 103 and the flattened second surface 107, if additional absorption of light is needed or for ease of manufacturing. As shown in FIG. 3, the light 105 passing through the fiber ribbon 100 (see above discussion of FIG. 1), results in viewed light 305. For example, viewed light 305 may include light viewable through the fiber ribbon 100. Viewed light 305 is directed in a direction substantially identical to the source light 303, which is light that does not pass from one medium to another. As can be seen in FIG. 3, the portion of light that is directed to edge 101 is absorbed by opaque portion 301 and is not permitted to exit the fiber ribbon 100. Therefore, substantially all of the light passing through the fiber ribbon 100 is viewed light 305, which is substantially undistorted.

In the embodiment shown in FIG. 3, the opaque portion 301 may be formed by providing an optically transparent glass rod with an optically opaque glass material (e.g., black glass particles) or coating on portions of the rod, corresponding to edges 101 of the ribbon fiber 100. The fiber ribbons 100 may be drawn using any known glass fiber drawing technique known in the art. The formed glass fiber ribbon 100 includes a transparent portion along the flattened first surface 103 and along the flattened second surface 107 and an opaque portion 301 along edge 101. The flattened first surface 103 and the flattened second surface are substantially planar and are preferably substantially parallel to each other.

Figure 4:
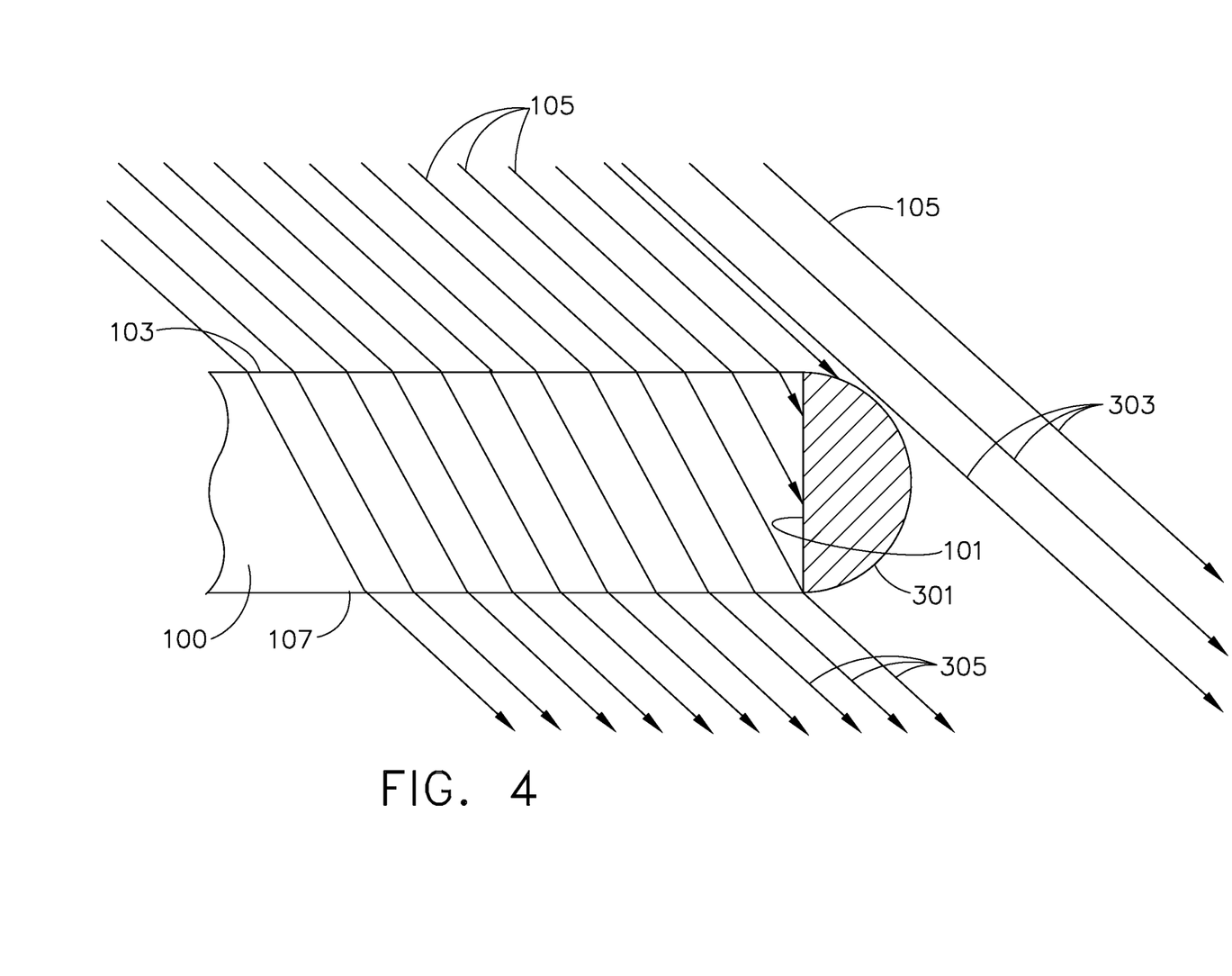
FIG. 4 shows a schematic cross-sectional view of a fiber ribbon according to another embodiment of the present disclosure.

FIG. 4 shows an alternative embodiment, wherein the fiber ribbon 100 includes a substantially identical structure to the fiber ribbon 100 of FIG. 3 wherein the opaque portion 301 affixed to edge 101 is a semicircular material. As in FIG. 3, substantially all of the light passing through the fiber ribbon 100 is viewed light 305, which is substantially undistorted.

In the embodiment shown in FIG. 4, the opaque portion 301 may be formed by heating optically transparent glass and an optically opaque glass rod together during the drawing of the fiber ribbons 100. The fiber ribbons 100 may be drawn using any known glass fiber drawing technique known in the art. The formed glass fiber ribbon 100 includes a transparent portion along the flattened first surface 103 and along the flattened second surface 107 and an opaque portion 301 along edge 101.

Figure 5:
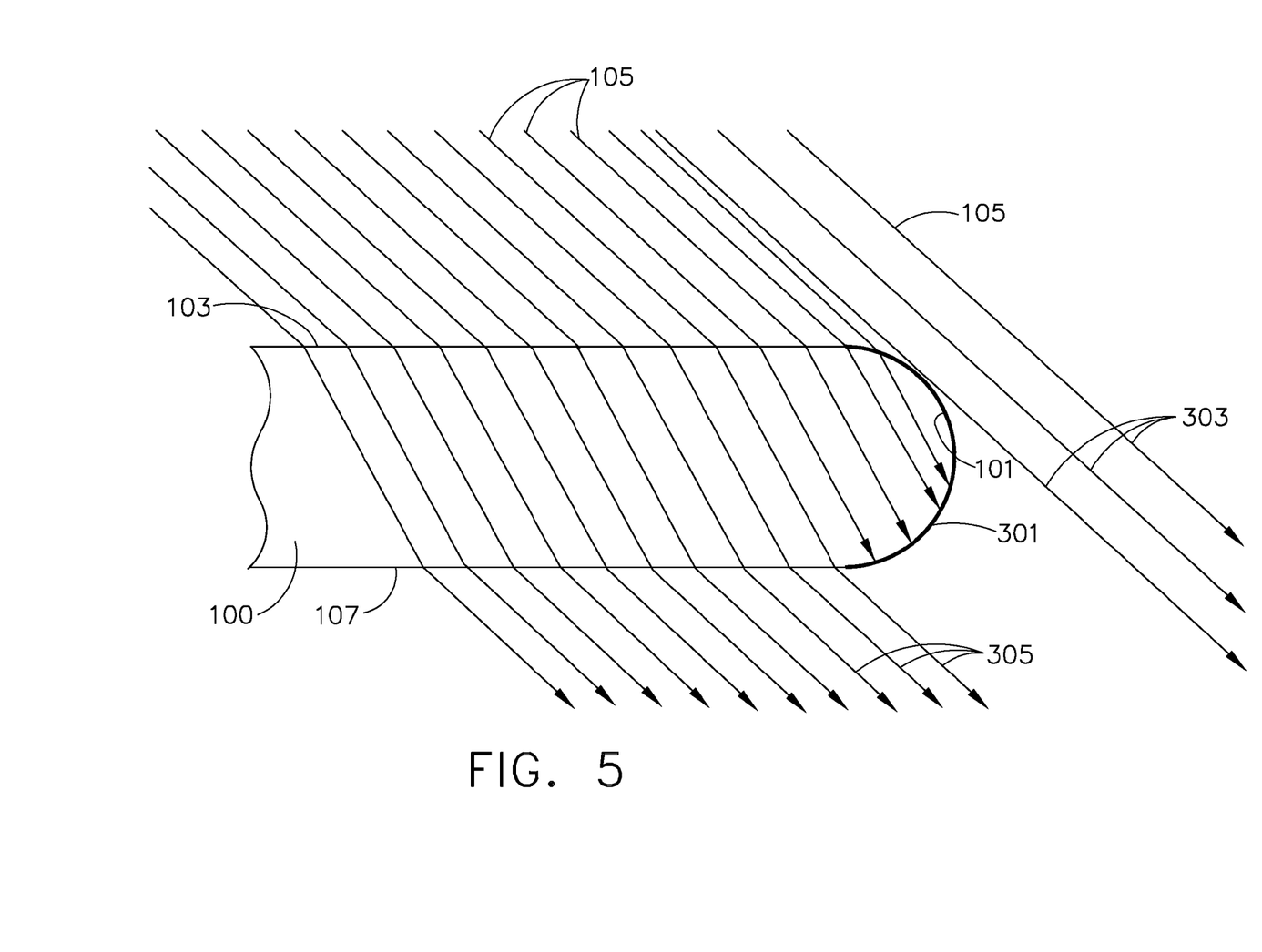
FIG. 5 shows a schematic cross-sectional view of a fiber ribbon according to still another embodiment of the present disclosure.
Figure 6:
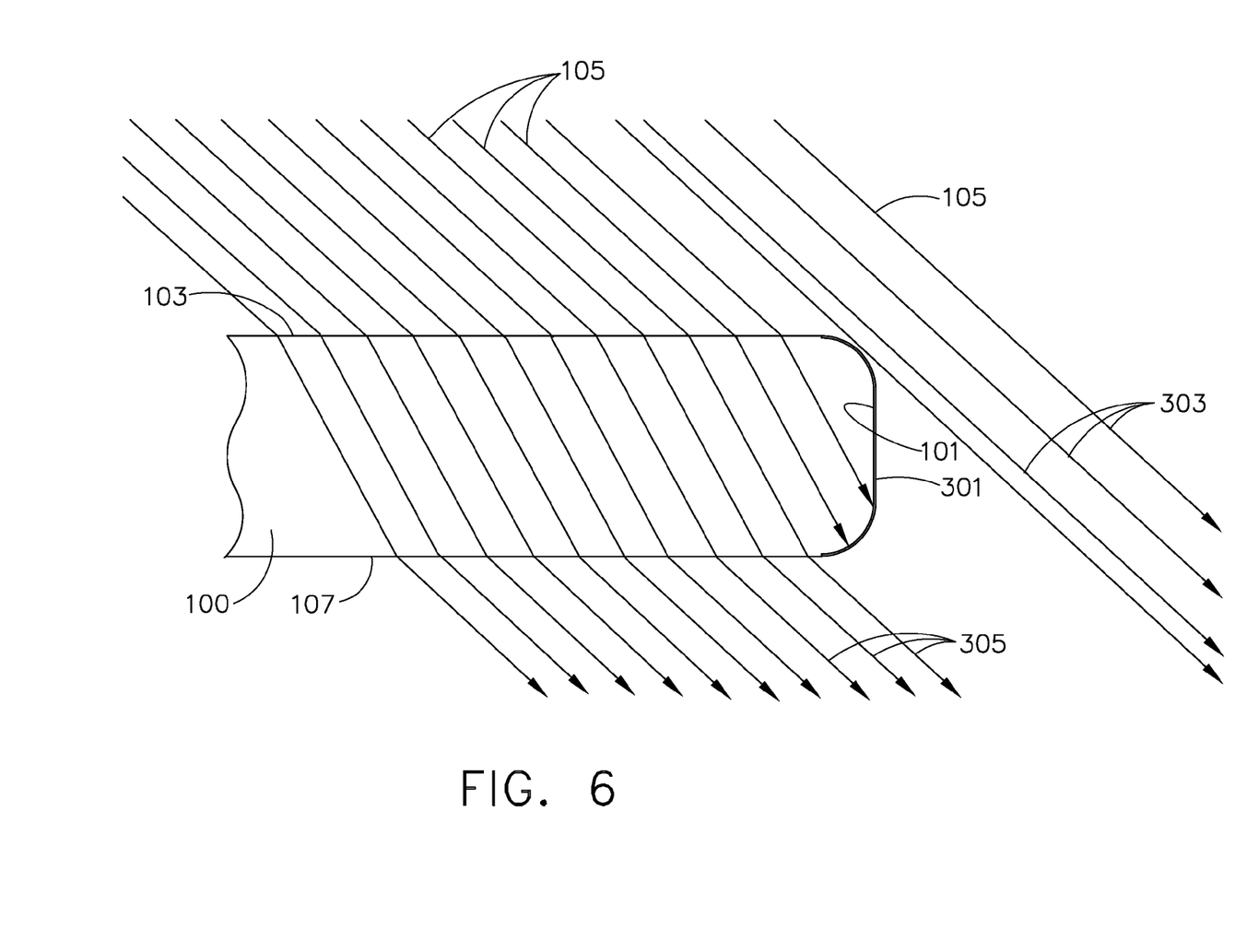
FIG. 6 shows a schematic cross-sectional view of a fiber ribbon according to still another embodiment of the present disclosure.

FIGS. 5 and 6 shows alternative embodiments of the present disclosure, wherein the fiber ribbons 100 include a substantially identical structure to the fiber ribbon 100 of FIG. 3. In FIGS. 5 and 6, the opaque portion 301 is a coating formed or applied on the edge 101 of the fiber ribbon 100. The coating on the edge 101 includes an opaque paint or opaque material that is coated on the edge 101 of the fiber ribbon 100. In certain embodiments, the opaque paint or opaque material may be applied to the edge 101 of the fiber ribbon 100 and allowed to dry or cure. In other embodiments, the paint or opaque material may be applied prior to drawing, wherein the opaque portions 301 remain on edge 101. As in FIG. 3, substantially all of the light passing through the fiber ribbon 100 is viewed light 305, which is substantially undistorted.

While the above has been shown and described as providing opaque portions 301 that are applied during the formation or after the formation of the fiber ribbon 100, the invention is not limited to these embodiments. The opaque portions 301 may also be integrally formed into the fiber ribbons 100 during production of the fiber ribbon 100 by processing the fiber ribbon to include opaque portions corresponding to the edges 101 of the fiber ribbons 100. For example the fiber ribbon 100 may be pulled or drawn from a melt pool, wherein the opaque portions 301 may be painted onto the pulled fiber ribbon 100 surface or integrally formed from adjacent melt pools of opaque material. In addition, while the above has been described as opaque portions 301 on the edges 101, the opaque portions may also cover some portion of the flattened first surface 103 and the flattened second surface 107, as desired for providing absorption of additional light that may be undesirably refracted or for ease of manufacturing, provided light is permitted to pass through the bulk of the fiber ribbon 100.

Figure 7:
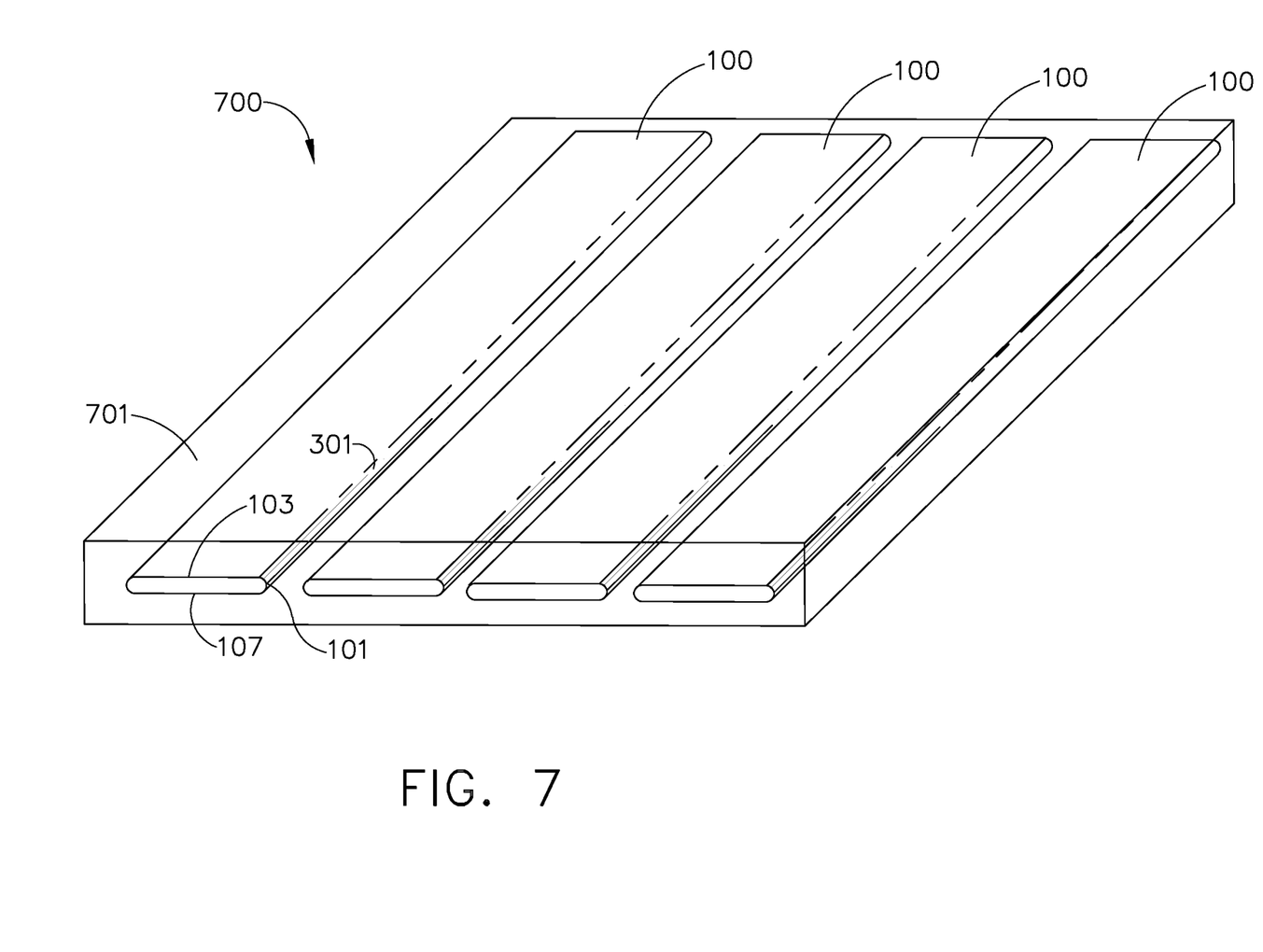
FIG. 7 shows a top perspective view of a reinforced matrix composite according to an embodiment of the present disclosure.

FIG. 7 shows a reinforced composite article 700 according to an embodiment of the present disclosure. The composite article 700 is preferably a transparent article having fiber ribbons 100 incorporated into a matrix material 701. The matrix material 701 is a substantially transparent material that permits the passage of light. Although FIG. 7 shows a substantially parallel arrangement of fiber ribbons 100, the disclosure is not so limited. For example, the composite article 700 may include a plurality of fiber reinforced layers with fiber ribbons 100 at various angles to provide desirable mechanical properties. The matrix material 701 may include any suitable material for use in the reinforced composite that is capable of incorporating fiber ribbons 100 and providing passage of light. Suitable matrix materials 701 include, but are not limited to polymers, ceramics or glasses. For example, the matrix material 701 may include, but is not limited to, a thermoplastic resin material, such as polycarbonate, polyetherimide or a thermoset resin material, such as poly(methyl methacrylate), epoxy or bismaleimide or other transparent resin materials. In addition, the matrix material 701 may include, but is not limited to, a ceramic such a calcium fluoride. The matrix material 701 utilized depends on the application, including the ambient temperatures and the temperatures of exposure. The fiber ribbons 100 include a structure, such as the structure, including opaque portion 301, as shown in FIGS. 3-6. The arrangement of the fiber ribbon 100 is not limited to the arrangement shown and may include any arrangement that provide reinforcement of the composite article 700. The optical properties of the matrix material 701 may vary with conditions, such as temperature. Therefore, the absorption of light at edges 301 allows only light passing between the fiber ribbons 100 and light passing through the flattened first surface 103 and the flattened second surface 107 of the fiber ribbon 100. Therefore, the refraction of light and the direction in which the light is directed is substantially the same across the composite article 700, even at various temperatures.

While not so limited, the transparent composite article 700 is suitable for use as a component of a window assembly or other transparent device. Window assembly, as used herein includes a window and components associated with the window, including the window, frames, mounting devices, or other associated equipment or devices. For example, the transparent composite article 700 may be assembled into a window assembly for an aircraft or a transparent portion of an automobile, armored vehicle (e.g., a personnel carrier or transport) or boat (e.g., a glass-bottomed boat). In addition, the transparent composite article 700 may be assembled into a window assembly for a stationary structure, such as a skyscraper or other architectural structure. Further still, in addition to window applications, the transparent composite article 700 is suitable for use with riot gear or other personal protection, such as face shields or armshields, wherein it is desirable to permit viewing through a ballistic resistant material.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A reinforcing fiber ribbon for reinforcing a transparent matrix composite, the reinforcing fiber ribbon comprising:
a transparent portion having a refractive index;
a first flattened surface through which light incident in a first direction enters the transparent portion of the fiber and refracts, thereby changing its direction;
a second flattened surface, differing from the first flattened surface, through which light exits the transparent portion of the fiber ribbon and refracts a second time thereby changing its direction a second time to the first direction; and
opaque edge portions extending between and connecting the first flattened surface and the second flattened surface,
wherein the fiber ribbon has an elongated cross-section and the transparent portion forms the longer dimension thereof; and
wherein light entering the first flattened surface is prevented from passing through the opaque edge portions.

2. The fiber ribbon of claim 1, wherein the fiber ribbon has a rectangular geometry.

3. The fiber ribbon of claim 1, wherein the opaque edge portions are fabricated from an opaque material.

4. The fiber ribbon of claim 1, wherein the opaque edge portions are coated with an opaque material.

5. A transparent reinforced matrix composite comprising:
a transparent matrix material;
a plurality of reinforcing fiber ribbons disposed in the transparent matrix material, the fiber ribbons having an elongated cross-section and a transparent portion forming the longer dimension thereof and the transparent portion having a refractive index, the fiber ribbons comprising a first flattened surface through which light incident in a first direction enters the transparent portion of the fiber ribbons and refracts, thereby changing its direction, a second flattened surface, differing from the first flattened surface, through which light exits the transparent portion of the fiber ribbons and refracts a second time thereby changing its direction a second time to the first direction, and opaque edge portions extending between and connecting the first flattened surface and the second flattened surface; and
wherein light entering the first flattened surface is prevented from passing through the opaque edge portions.

6. The composite of claim 5, wherein the fiber ribbon has a rectangular geometry.

7. The composite of claim 5, wherein the opaque edge portions are fabricated from an opaque material.

8. The composite of claim 5, wherein the opaque edge portions are coated with an opaque material.

9. The composite of claim 5, wherein the transparent matrix material is a polymer.

10. The composite of claim 5, wherein the transparent matrix material is selected from the group consisting of poly (methyl methacrylate), polycarbonate, polyetherimide, bismaleimide and epoxy.

11. The composite of claim 5, wherein light distortion through the matrix composite is substantially eliminated.

12. The composite of claim 5, wherein the transparent reinforced matrix composite is configured into a window assembly.

13. The composite of claim 12, wherein the window assembly includes a window for an aircraft.

14. The composite of claim 12, wherein the window assembly includes a window for an architectural structure.

15. The composite of claim 5, wherein the transparent reinforced matrix composite is configured into a transparent shield.

16. A method for fabricating a window assembly comprising:
providing a plurality of reinforcing fiber ribbons, the fiber ribbons having an elongated cross-section section and a transparent portion forming the longer dimension thereof and the transparent portion having a refractive index, the fiber ribbons comprising a first flattened surface through which light incident in a first direction enters the transparent portion of the fiber ribbons and refracts, thereby changing its direction; a second flattened surface, differing from the first flattened surface, through which light exits the transparent portion of the fiber ribbons and refracts a second time thereby changing its direction a second time to the first direction, and opaque edge portions extending between and connecting the first flattened surface and the second flattened surface,
wherein light is prevented from passing through the opaque edge portions;
arranging and disposing the plurality of reinforcing fiber ribbons into a transparent matrix;
curing the matrix to form a transparent reinforced matrix composite; and
assembling the reinforced matrix composite into a window assembly.

17. The method of claim 16, wherein the fiber ribbons have a rectangular geometry.

18. The method of claim 16, wherein the opaque edge portions are fabricated from an opaque material.

19. The method of claim 16, wherein the opaque edge portions are coated with an opaque material.

20. The method of claim 19 wherein the opaque material is opaque glass.

21. The method of claim 16, wherein the transparent matrix material is a polymer.

22. The method of claim 16, wherein light distortion through the matrix is substantially eliminated.

23. A method of manufacturing a vehicle comprising:
providing a vehicle;
providing a transparent reinforced composite window assembly comprising:
a transparent matrix material; and
a plurality of reinforcing fiber ribbons disposed in the transparent matrix material, the fiber ribbons having an elongated cross-section and a transparent portion forming the longer dimension thereof and the transparent portion having a refractive index, the fiber ribbons comprising a first flattened surface through which light incident in a first direction enters transparent portion of the fiber ribbons and refracts, thereby changing its direction; a second flattened surface, differing from the first flattened surface, through which light exits the transparent portion of the fiber ribbons and refracts a second time thereby changing its direction a second time to the first direction, and opaque edge portions extending between and connecting the first flattened surface and the second flattened surface,
wherein light is prevented from passing through the opaque edge portions; and assembling the window assembly into the vehicle.

24. The method of claim 23, wherein the vehicle is an aircraft.

25. The method of claim 23, wherein the vehicle is an armored vehicle.

26. The fiber ribbon of claim 1, wherein the opaque edge portions are substantially perpendicular to the first flattened surface.

27. The composite of claim 5, wherein the opaque edge portions are substantially perpendicular to the first flattened surface.

* * * * *

UNITED STATES PATENT AND TRADEMARK OFFICE
CERTIFICATE OF CORRECTION

PATENT NO. : 9,334,378 B2  
APPLICATION NO. : 12/015221  
DATED : May 10, 2016  
INVENTOR(S) : Adam J. Lang et al.

Page 1 of 1

It is certified that error appears in the above-identified patent and that said Letters Patent is hereby corrected as shown below:

In the claims:

Claim 23 at column 8, line 24: after "enters" insert --the--.

Signed and Sealed this
Nineteenth Day of July, 2016

Michelle K. Lee
*Director of the United States Patent and Trademark Office*